United States Patent [19]

Yamada

[11] 4,277,160

[45] Jul. 7, 1981

[54] ELECTROSTATIC PRINTER

[75] Inventor: Yoshihiro Yamada, Chiba, Japan

[73] Assignee: Tokyo Shibaura Denki Kabushiki Kaisha, Kawasaki, Japan

[21] Appl. No.: 72,842

[22] Filed: Sep. 6, 1979

[30] Foreign Application Priority Data

| | | | |
|---|---|---|---|
| Sep. 13, 1978 | [JP] | Japan | 53-125620[U] |
| Sep. 13, 1978 | [JP] | Japan | 53-125621[U] |
| Sep. 13, 1978 | [JP] | Japan | 53-125622[U] |
| Sep. 13, 1978 | [JP] | Japan | 53-125623[U] |
| Dec. 16, 1978 | [JP] | Japan | 53-172720[U] |

[51] Int. Cl.[3] ..................... G03G 15/00; G03G 21/00; G03B 27/00

[52] U.S. Cl. ....................................... 355/3 R; 355/1; 355/15

[58] Field of Search .............................. 355/1, 3 R, 15

[56] References Cited

U.S. PATENT DOCUMENTS

| | | | |
|---|---|---|---|
| 3,641,605 | 2/1972 | Lindsay | 355/15 X |
| 3,890,038 | 6/1975 | Ichikawa | 355/1 |
| 3,941,558 | 2/1976 | Takiguchi | 355/15 X |
| 4,025,181 | 5/1977 | Menon et al. | 355/15 X |
| 4,074,217 | 2/1978 | Yanagawa | 355/15 X |

FOREIGN PATENT DOCUMENTS

| | | | |
|---|---|---|---|
| 49-125038 | 11/1974 | Japan | 355/15 |

*Primary Examiner*—Fred L. Braun
*Attorney, Agent, or Firm*—Cushman, Darby & Cushman

[57] ABSTRACT

An electrostatic printer comprises a movable photosensitive body, a cathode ray tube adapted to transmit a light image to the photosensitive body through an optical fiber plate located near the photosensitive body to form an electrostatic image on the photosensitive body, a developing unit, a fixer, a transparent film provided between the photosensitive body and the optical fiber plate such that it covers and contacts with the optical fiber plate, the transparent film being moved in a direction opposite to that in which the photosensitive body is moved and a roller contacting the film and urging it into contact with the plate to eliminate any slack.

6 Claims, 9 Drawing Figures

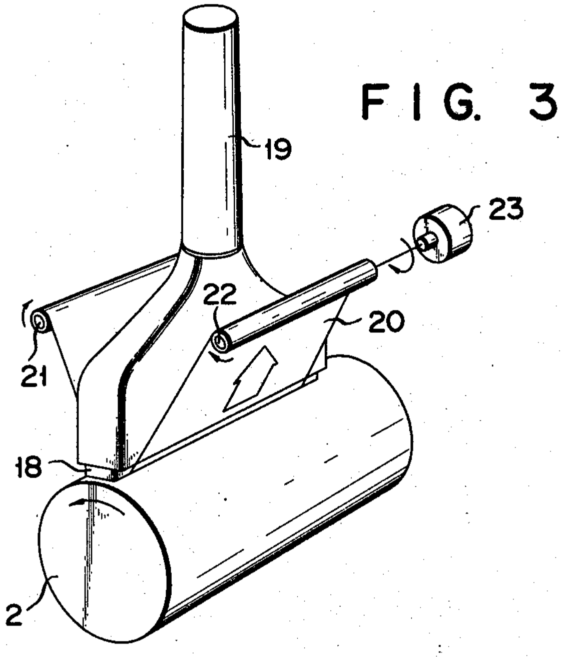
FIG. 3
FIG. 4
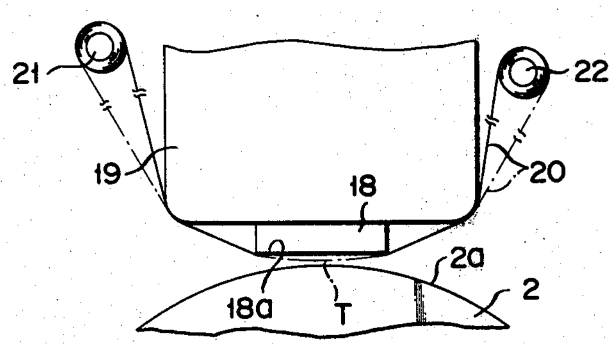

FIG. 5
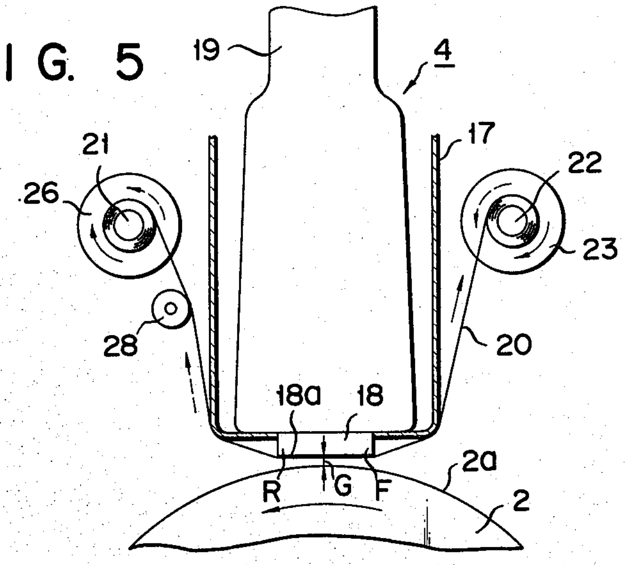
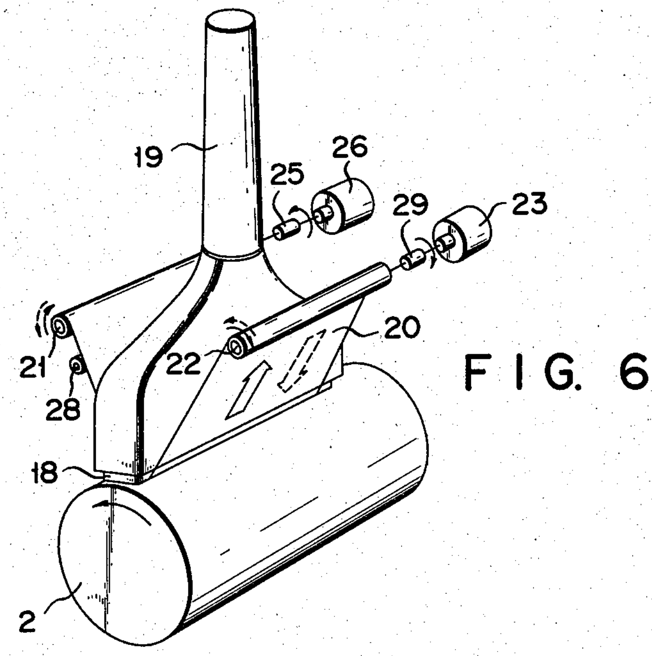
FIG. 6

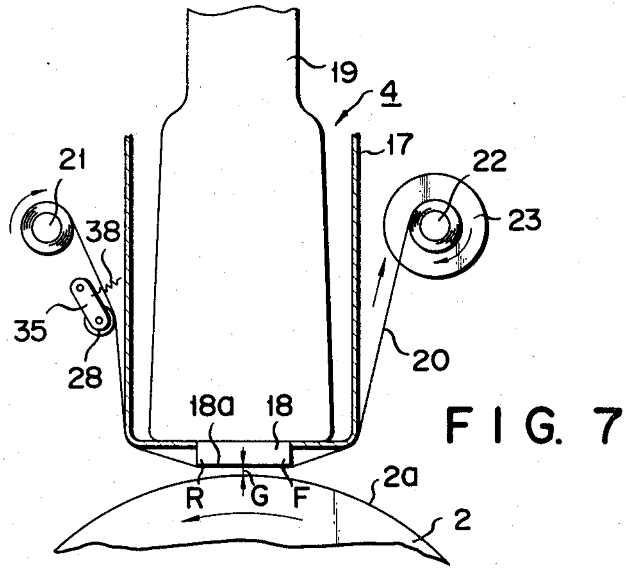
FIG. 7
FIG. 8
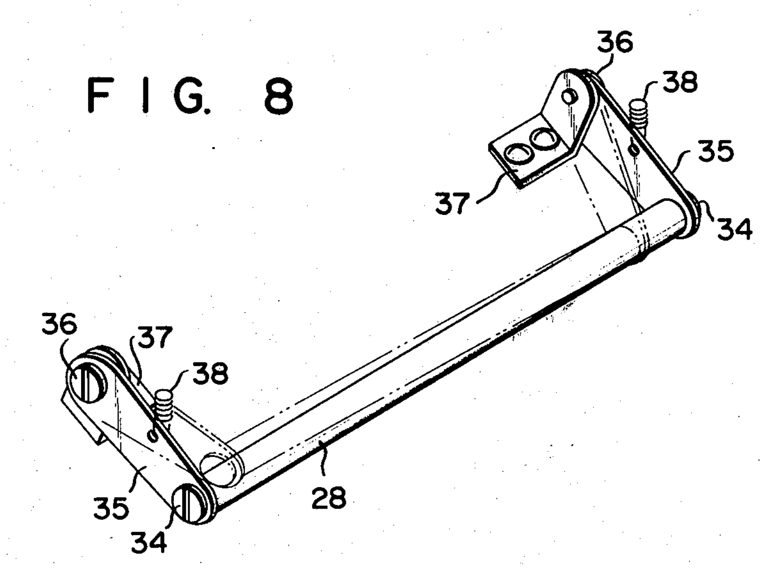

ELECTROSTATIC PRINTER

BACKGROUND OF THE INVENTION

This invention relates to an electrostatic printer and in particular to a non-impact printer using an OFT-tube.

In an electrostatic printer, a device for transmitting a light image to a photosensitive body or a photoreceptor to form an electrostatic image is generally called an "OFT-tube" or an "OFT-unit". The OFT-tube comprises a cathode ray tube and an about 5 mm-thick optical fiber plate or head plate which is comprised of a bundle of glass fibers normally having a diameter of about 20 μm and joined to the surface of the cathode ray tube. The head plate of the OFT-tube is located a slight distance of 0.1 to 0.2 mm away from the surface of the photosensitive surface and a slight static electricity is formed on the head plate, causing the surface of the head plate to be contaminated by the deposition of a toner thereon and thus being unable to obtain a clean-cut image.

Japanese patent Disclosure No. 49-125038 (disclosed on Nov. 29, 1974-inventor: Tsukada et al) discloses an apparatus in which in order to prevent the surface of a head plate of an OFT-tube from being contaminated by a toner a transparent film is provided between the surface of a photosensitive body and the head plate so as to be moved relative to the photosensitive body and a cleaning liquid is supplied between the film and the photosensitive body to permit a proper voltage to be applied to the liquid. Since in this apparatus the cleaning liquid is flowed between the photosensitive body and the transparent film the setting position of the OFT-tube is restricted to a greater extent. Further, it is necessary to use a photosensitive body of greater size of diameter. In consequence, it would be difficult to provide a compact apparatus. The apparatus also requires a cleaning liquid supply means, a cleaning liquid collecting means and a means for applying a voltage to the cleaning liquid. As a result, the apparatus is complicated in its arrangement and it is not easy to exchange transparent films.

SUMMARY OF THE INVENTION

It is accordingly an object of this invention to provide an electrostatic printer which is simple in its construction and prevents a head plate of an OFT-tube from being contaminated by a toner to obtain a clear-cut copy over a lengthy period of time.

According to this invention there is provided an electrostatic printer comprising a photosensitive body, a means having a cathode ray tube and adapted to transmit a light image to the photosensitive body through an optical fiber plate i.e. a head plate located near the photosensitive body to form an electrostatic image on the photosensitive body, a means for developing an electrostatic image, a means for fixing a developed image to a paper, and a transparent film provided between the photosensitive body and the optical fiber plate such that it covers and contacts with the optical fiber plate, the transparent film being moved in a direction opposite to that in which the photosensitive body is moved.

An urging means may be provided to impart a tension to the transparent film. The transparent film is closely contacted by the urging means with the optical fiber plate without any slack. When a once-used transparent film is wound back for reuse, the urging means functions as a cleaner for removing a toner deposited on the transparent film.

BRIEF DESCRIPTION OF THE DRAWINGS

FIG. 3 is a schematic view showing a major part of FIG. 1;

FIG. 4 is an explanatory view showing the state in which a transparent film is closely contacted with a head plate of an OFT-tube;

FIG. 5 is an enlarged view showing a modified form of electrostatic printer;

FIG. 6 is a perspective view of FIG. 5; and

FIGS. 7 to 9 are explanatory views showing a desired urging means for imparting a tension to the transparent film.

DESCRIPTION OF THE PREFERRED EMBODIMENT

An electrostatic printer according to one embodiment of this invention will be described below.

Figure 1:
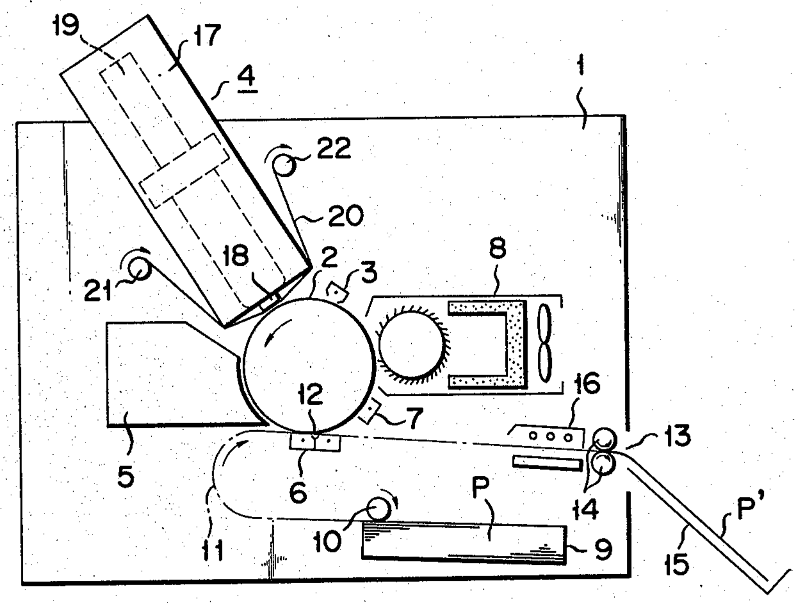
FIG. 1 is a diagrammatic view generally showing an electrostatic printer according to this invention.

FIG. 1 is a diagrammatic view showing an electrostatic printer as a whole. A drum-like photosensitive body 2 is disposed at the substantially central portion of a printer body 1. A charger 3, OFT unit 4, developing unit 5, transfer corona discharger 6, cleaning charger 7 and cleaning unit 8 are disposed around the circumference of the photosensitive body 2. A paper supply cassette 9 is disposed on the inner base of the printer body 1. Papers P are taken sheet by sheet through a paper supply roller 10 and supplied into a paper conveying path 11 as indicated by a dot-dash line, and through a transfer station 12 between the photosensitive body 2 and the transfer corona discharger 6 into a paper delivery outlet 13 where the paper P is delivered through a pair of paper delivery rollers 14, 14 into a tray 15 outside the printer body 1.

Figure 2:
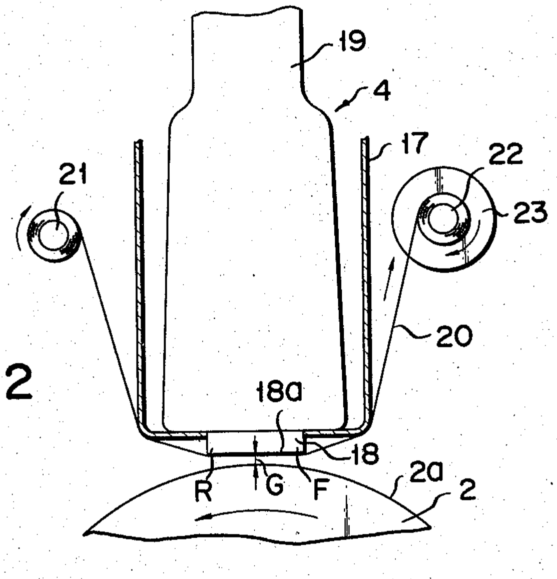
FIG. 2 is an enlarged view showing a major part of FIG. 1.

16 shows a fixing unit disposed at the terminal end portion of the paper conveying path 11. The above-mentioned OFT unit 4 comprises a holder case 17 and CRT (cathode ray tube) 19 held in the holder case 17 such that a head plate 18 is projected outside the holder case 17. CRT 19 is disposed such that a gap G of about 0.1 to 0.2 mm is formed, as shown in FIG. 2, between a surface 18*a* of the head plate 18 and a surface 2*a* of the photosensitive body 2. A film 20 for preventing the contamination of the head plate is interposed between the surface 18*a* of the head plate 18 and the surface 2*a* of the photosensitive body 2. The head plate contamination preventing film 20 is formed of an about 20 to 25 μ-thick transparent film such as polyester, polyamide, polypropylene or polyethylene and has one end wound around a supply roll 21 and the other end wound around a takeup roll 22 with the intermediate portion thereof run over the forward end of the OFT unit 4. As a result, the film 20 covers the surface 18*a* of the head plate 18 in substantially u-shape fashion.

Consideration is paid to the winding direction of the film 20 with respect to the rolls 21 and 22 such that a crest T of a circular arc (see FIG. 4) created by the winding habit is not formed with respect to the surface 18*a* of the head plate 18. In consequence, the film 20 is positively contacted with the surface 18*a* of the head plate 18 without being floated from the surface 18*a* of the head plate 18.

Since the takeup roll 22 as shown in FIG. 3 is driven by a takeup motor 23 the film 20 is transferred in a direction opposite to that in which the surface of the photosensitive body 2 is moved.

The operation of the above-mentioned printer will be explained below.

First of all, the printing process will be explained by referring to FIG. 1. The photosensitive body 2 is rotated in the counter-clockwise direction and through a corona discharge by the charger 3 a charge of several hundreds of volts is built up onto the surface 2*a* of the photosensitive body 2. Then, necessary information is converted by CRT 19 from an electrical to an optical signal which is directed toward the surface 2*a* of the photosensitive body 2. That surface portion of the photosensitive body illuminated by a light is made free from the charge and then faces the developing unit 5 where a toner is deposited onto the surface of the photosensitive body to form a toner image on the surface 2*a* of the photosensitive body 2. A paper P is sent from the paper supply cassette 9 into the paper supply path 11 in synchronism with the formation of the toner image onto the surface 2*a* of the photosensitive body 2 and passed through a transfer station 12 provided with respect to the surface 2*a* of the photosensitive body 2. At this time, the toner image formed on the surface 2*a* of the photosensitive body 2 is transferred onto the paper P by the action of the transfer corona discharge 6 and, after being separated away from the photosensitive body, sent toward the paper delivery outlet 13. On the way to the paper delivery outlet 13, the toner image on the paper is fixed by the fixing unit 16 and sent through the paper delivery outlet 13 into the tray 15 where the printed paper P' is received.

After the toner image has been transferred to the paper the resultant surface portion of the photosensitive body 2 faces the cleaning charger 7 where a residual charge on the surface of the photosensitive body is cleaned, and then faces the cleaning unit 8 where a residual toner on the surface of the photosensitive body is cleaned.

When the printer is used under the high temperature/high moisture conditions there is a tendency that an amount of charge of the toner is lowered with the attendant scattering. Moreover, a residual toner which has not been completely removed is unstably left on the surface 2*a* of the photosensitive body 2. The gap G between the surface 18*a* of the head plate 18 of CRT 19 and the surface 2*a* of the photosensitive body 2 is a very small value of 0.1 mm$\sim$0.2 mm. A slight static electricity is formed on the surface 18*a* of the head plate 18, tending to deposit a scattered toner and residual toner on the surface 18*a* of the head plate 18. Since the film 20 is closely contacted with the surface 18*a* of the head plate 18 the toner is deposited onto the film 20, preventing the surface 18*a* of the head plate 18 from being directly contaminated. At this time, a film portion on the front side F of the head plate 18 meets with the residual toner earlier than a film portion on the rear side R of the head plate 18 and tends to be contaminated to a greater extent than the film portion on the rear side R. When the motor 23 is driven based on various signals for copying one sheet of paper P, such as a paper supply, a paper leading edge and a paper delivery signal and thus the takeup roll 22 is rotated a predetermined amount, the film 20 is moved in a direction opposite to that in which the surface 2*a* of the photosensitive body 2 is moved. That is, the film is moved a necessary amount away from the head plate 18 such that the film portion on the front end side F of the head plate is directed ahead. As a result, that film portion which is not contaminated by the toner faces the head plate 18 to permit a light to always illuminate the clean portion of the film. In this way, a copy of a clear-cut image is obtained.

Although with the above-mentioned embodiment the film is moved a necessary amount by moving the motor based on a copying signal of CRT 19 as obtained when the paper is copied, this invention is not restricted thereto. For example, the film can be moved manually or in synchronism with the action of the developing unit or a main motor during the printing operation. It is sufficient if the film is moved for every sheet of paper, or for every few sheets of paper if necessary, dependent upon the extent to which the film is contaminated.

FIG. 5 shows a modified form of electrostatic printer. In the modification of FIG. 5 an urging means 28 is provided to impart a tension to a film 20. The urging means 28 is formed of a rotatable roller preferably made of a porous, elastic material, but this invention is not restricted thereto. For example, a plate-like member may be used as such.

In FIG. 6 a wind-back motor 26 is coupled through a clutch 25 to a delivery roll 21 and, by so doing, a once-used film can be wound back in a direction as indicated by a dotted line in FIGS. 5 and 6. In this case, the urging roller 28 serves as a cleaner for removing a toner deposited on a film 20. In FIG. 6, 29 shows a clutch by which a take-up roll 22 is coupled to a take-up motor 23. A combination of the wind-back motor 26 and urging roller 28 permits the reuse of a once-used film 20.

Figure 9:
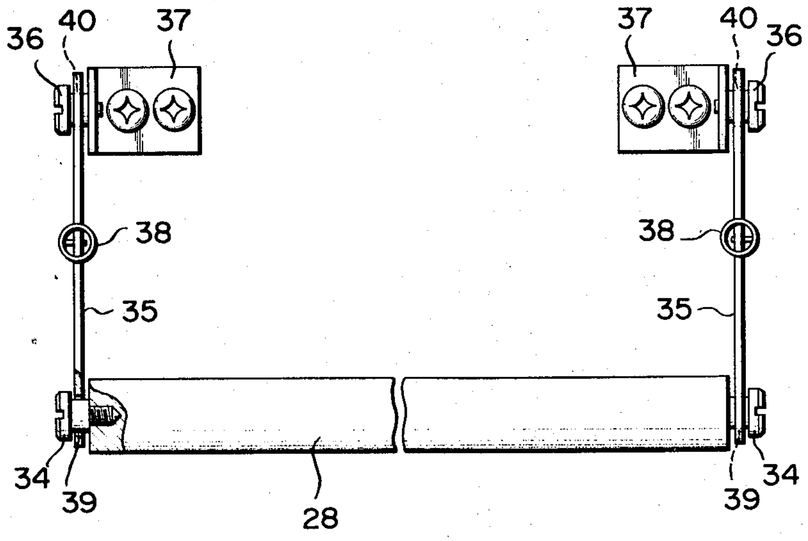

FIGS. 7 to 9 show a preferred form of urging roller 28. In FIG. 7 the urging roller 28 is provided in the neighborhood of a delivery roller 21 to permit a film 20 to be closely and positively contacted with a surface 18*a* of a head plate 18. As shown in FIGS. 8 and 9 the urging roller 28 is such that the respective ends thereof are rotatably mounted by screws 34, 34 on the free end portions of arms 35, 35 respectively. The arms 35, 35 are pivoted by screws 36, 36 to metal fittings 37, 37 and tension springs 38 are anchored halfway to the arms 35, 35 to cause the roller 28 to be normally urged in a counter-clockwise direction with the screws 36, 36 as a fulcrum. The roller 28 is adapted to be brought into an elastic, rolling contact with the film 20. The screws 34, 36 are inserted into holes 39, 40 of the arm 35. The holes 39, 40 of the arm 35 are formed with some latitude i.e. with a diameter rather greater than the diameter of the shank of the screws 34, 36 so that some freedom is provided at each end of the urging roller 28. Since the roller 28 rockably urges the film 20 with some latitude at each end thereof, slack of the film 20 can be completely removed.

What is claimed is:

1. An electrostatic printer comprising:

(1) a movable photosensitive body;

(2) means having a cathode ray tube and adapted to transmit a light image to the photosensitive body through an optical fiber plate located near the photosensitive body to form an electrostatic image on the photosensitive body;

(3) means for developing the electrostatic image;

(4) means for fixing a developed image to a paper;

(5) a transparent film provided between the photosensitive body and the optical fiber plate such that it covers and contacts with the optical fiber plate, said transparent film being moved in a direction opposite to that in which the photosensitive body is moved; and (6) urging means provided in pressure contact with the transparent film to impart a tension to the latter so that said film contacts said plate without slack.

2. An electrostatic printer according to claim 1 further including means for winding back said transparent film.

3. An electrostatic printer according to claim 2 in which, when the transparent film is wound back, said urging means acts as a cleaner for removing toner deposited on the film.

4. An electrostatic printer according to claim 1 in which said urging means is comprised of a rotatable roller.

5. An electrostatic printer according to claim 1 further including drive means for moving said film in synchronism with a copying signal from said cathode ray tube.

6. An electrostatic printer according to claim 1 in which said transparent film is urged by said urging means on the side of a film supply roll so that a proper tension is imparted to the film between the optical fiber plate and the surface of a photosensitive body.

* * * * *